United States Patent
Kang et al.

(10) Patent No.: US 10,302,763 B2
(45) Date of Patent: May 28, 2019

(54) METHOD FOR DETECTING PROXIMITY OF OBJECT AND ELECTRONIC DEVICE USING THE SAME

(71) Applicant: Samsung Electronics Co., Ltd., Gyeonggi-do (KR)

(72) Inventors: Seunggoo Kang, Gyeonggi-do (KR); Jaehwan Lee, Gyeonggi-do (KR); Yongjun Park, Gyeonggi-do (KR); Gihoon Lee, Gyeonggi-do (KR); Dongil Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/904,666

(22) Filed: Feb. 26, 2018

(65) Prior Publication Data
US 2018/0246206 A1    Aug. 30, 2018

(30) Foreign Application Priority Data
Feb. 28, 2017    (KR) .......................... 10-2017-0025978

(51) Int. Cl.
*G01S 15/06* (2006.01)
*H04M 1/725* (2006.01)
*H04R 19/04* (2006.01)

(52) U.S. Cl.
CPC ......... *G01S 15/06* (2013.01); *H04M 1/72519* (2013.01); *H04M 1/72569* (2013.01);
(Continued)

(58) Field of Classification Search
CPC .............. G01S 15/06; H04M 1/72519; H04M 1/72569; H04M 2250/12; Y02D 70/1264;
(Continued)

(56) References Cited

U.S. PATENT DOCUMENTS 9,445,214 B2 *   9/2016   Norris ............... H04M 1/72572
2002/0068537 A1   6/2002   Shim et al.
(Continued)

FOREIGN PATENT DOCUMENTS

JP    2003-158767 A   5/2003
WO   2012/105253 A1   8/2012

OTHER PUBLICATIONS

European Search Report dated Jun. 28, 2018.

*Primary Examiner* — Nay A Maung
*Assistant Examiner* — Angelica M Perez
(74) *Attorney, Agent, or Firm* — Cha & Reiter, LLC.

(57) ABSTRACT

Disclosed are an electronic device and method for detecting the proximity of an object. In an embodiment, the electronic device includes a communication module, a sound emitter, a sound receiver, and a processor. The processor receives at least one part of a voice signal from a calling party through the communication module, and determines whether there is a voice idle time in the at least one part of the voice signal. When the voice idle time is present in the at least one part of the voice signal, the processor outputs a sound wave in an inaudible frequency band through the sound emitter during the voice idle time. Then the processor receives, through the sound receiver, sound wave in the inaudible frequency band reflected from an object. Next, the processor may detect whether the object is proximate to the electronic device using the reflected sound wave in the inaudible frequency band.

20 Claims, 11 Drawing Sheets

(52) U.S. Cl.
CPC ......... *H04M 2250/12* (2013.01); *H04R 19/04* (2013.01); *H04R 2400/01* (2013.01); *Y02D 70/00* (2018.01); *Y02D 70/10* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/20* (2018.01); *Y02D 70/26* (2018.01)

(58) Field of Classification Search
CPC ...... Y02D 70/168; Y02D 70/20; Y02D 70/26; Y02D 70/142; Y02D 70/00; Y02D 70/1262; Y02D 70/144; Y02D 70/164; Y02D 70/1242; Y02D 70/10; Y02D 70/166; H04R 19/04; H04R 2400/01
See application file for complete search history.

(56) References Cited

U.S. PATENT DOCUMENTS

| | | | |
|---|---|---|---|
| 2008/0292115 A1 | 11/2008 | Ding et al. | |
| 2011/0003614 A1 | 1/2011 | Langereis et al. | |
| 2011/0260923 A1* | 10/2011 | Liao | G01S 11/06 342/458 |
| 2013/0315034 A1 | 11/2013 | Yagihashi et al. | |
| 2015/0042789 A1* | 2/2015 | Inwood | G01B 11/026 348/135 |
| 2017/0223170 A1* | 8/2017 | Winebrand | H04M 1/72569 |

* cited by examiner

METHOD FOR DETECTING PROXIMITY OF OBJECT AND ELECTRONIC DEVICE USING THE SAME

CROSS REFERENCE TO RELATED APPLICATION(S)

This application claims the benefit under 35 U.S.C. § 119(a) of a Korean patent application filed on Feb. 28, 2017 in the Korean intellectual property office and assigned serial number 10-2017-0025978, the entire disclosure of which is hereby incorporated by reference.

BACKGROUND

Field

Various embodiments of the present disclosure generally relate to a method for detecting the proximity of an object and to an electronic device using the method.

Description of Related Art

Electronic devices such as portable terminals (e.g., smart phones) may detect the proximity of a user's face using a proximity sensor equipped therein. The proximity sensor may be an optical proximity sensor that uses infrared rays or a non-optical proximity sensor that uses ultrasonic waves. When the object (e.g., the user's face) approaches the portable terminal, for example when the user brings the device up to his or her face to take a phone call, the proximity sensor may turn off the display screen and deactivate the touch panel of the electronic device. Thus, it is possible to prevent accidental operation such as unintended touch inputs on the touch panel. Also, power consumption of the portable terminal may be reduced.

The optical proximity sensor may be located in the bezel region of the portable terminal. However, the design of portable terminals has recently trended towards having thinner or smaller bezels. This is so that the portable terminals may have full frontal displays that occupy substantially the front face area of the portable terminals. It may be therefore difficult to mount the optical proximity sensor in the portable terminals.

In addition, non-optical proximity sensors may require additional components and corresponding holes in the enclosures of the portable terminals so that ultrasonic waves can pass through the enclosures. In this case, due to the decrease in bezel size and these additional requirements, there may be insufficient space to mount the non-optical proximity sensors. Further, the holes in the enclosures may require suitable sealing structures.

SUMMARY

According to various embodiments of the present disclosure, an electronic device may perform non-optical proximity detection by utilizing a sound emitter (e.g., a speaker) and a sound receiver (e.g., a microphone) that can be used in other operations of the electronic device (e.g. telephone calls). As a result, additional holes and related sealing are not required.

However, in doing so, when a signal in the audible frequency band (e.g., a voice signal) and a signal in the inaudible frequency band (e.g., an ultrasonic wave) are emitted together, for example during a phone call, the signal in the inaudible frequency band may generate noise in the phone call deteriorate call quality.

According to various embodiments of the present disclosure, an electronic device may provide a specific operation of emitting signals in the audible frequency band and the inaudible frequency band together so as to prevent noise generation. This enables the electronic device to perform non-optical proximity detection of the user's face without deterioration of call quality.

According to various embodiments of the present disclosure, an electronic device may include a communication module, a sound emitter, a sound receiver, and a processor electrically connected to the communication module, the sound emitter, and the sound receiver. The processor may be configured to receive at least a part of one voice signal from a calling party through the communication module, to determine whether there is a voice idle time in the at least one part of the voice signal, to output a sound wave in an inaudible frequency band through the sound emitter during the voice idle time, when the voice idle time is present in the at least one part of the voice signal, to receive, through the sound receiver, sound wave in the inaudible frequency band reflected from an object, and to detect whether the object is proximate to the electronic device using the reflected sound wave in the inaudible frequency band.

According to various embodiments of the present disclosure, a method for detecting proximity of an object at an electronic device may include receiving at least one part of a voice signal from a calling party; determining whether there is a voice idle time in the at least one part of the voice signal; outputting a sound wave in an inaudible frequency band through a sound emitter during the voice idle time, when the voice idle time is present in the at least one part of the voice signal; receiving, through a sound receiver, sound wave in the inaudible frequency band reflected from the object; and detecting whether the object is proximate to the electronic device using the reflected sound wave in the inaudible frequency band.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
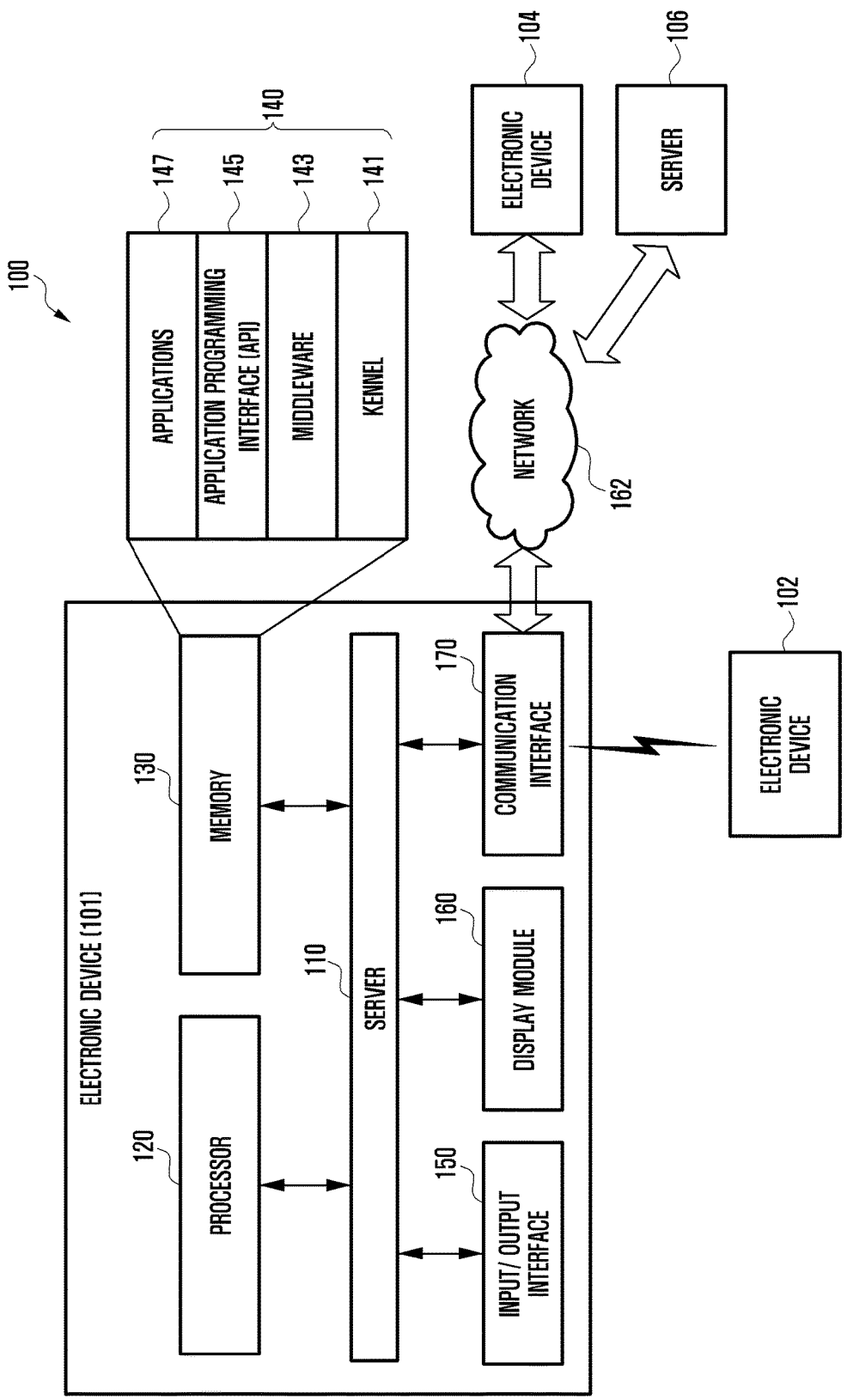
FIG. 1 is a diagram illustrating a network environment including an electronic device according to one embodiment of the present disclosure.

Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is not limited thereto. The same reference numerals are used throughout the present disclosure to refer to the same or like parts.

An expression "comprising" or "may comprise" used in the present disclosure indicates presence of a corresponding function, operation, or element and does not limit additional functions, operations, or elements. The term "comprise" or "have" used herein indicates presence of a characteristic, numeral, step, operation, element, component, or combination thereof described in the Specification. But these terms do not exclude the presence or addition of other characteristics, numerals, steps, operations, elements, components, or combinations thereof.

In the present disclosure, the term "or" may refer to any combination of the associated words. For example, "A or B" may include A, B, or A and B.

Expressions such as "a first" and "a second" in the present disclosure may refer various elements of the present disclosure, but do not limit the corresponding elements. These terms do not limit order and/or importance of corresponding elements, but may be used for distinguishing one element from another element. For example, both a first user device and a second user device are user devices, and they may be different user devices. Alternatively, a first constituent element may be referred to as a second constituent element without deviating from the scope of the present disclosure, and similarly, a second constituent element may be referred to as a first constituent element.

When it is described that a first element is "coupled" to another element, such as a second element, the first element may be "directly coupled" to the second element or coupled to the second element through a third element. However, when it is described that a first element is "directly coupled" to a second element, no intervening third element exists between the first and second elements.

Terms used in the present disclosure are not intended to limit the present disclosure but rather are used to illustrate embodiments of the present disclosure. When used in the description of the present disclosure and in the appended claims, singular forms of a word may also refer to the plural unless otherwise indicated.

Unless explicitly defined, terms including technical terms and scientific terms used herein have the same meaning as may be generally understood by a person of ordinary skill in the art. It should be understood that generally, unless explicitly defined, the meanings of the terms used herein are the same as those known in the relevant art.

In this disclosure, the electronic device may perform communication functions and may be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch.

According to another embodiment, the electronic device may be a smart home appliance such as a TV (television), a DVD (digital video disk) player, audio equipment, a refrigerator, an air conditioner, a vacuum cleaner, an oven, a microwave, a washing machine, an air cleaner, a TV set-top box, such as Samsung HomeSync™, Apple TV™, and Google TV™, a game console, an electronic dictionary, an electronic key, a camcorder, or an electronic picture frame.

According to another embodiment, the electronic device may be a medical device, such as a MRA (magnetic resonance angiography) device, a MRI (magnetic resonance imaging) device, a CT (computed tomography) device, or an ultrasonography device, a navigation device, a GPS (global positioning system) receiver, an EDR (event data recorder), an FDR (flight data recorder), a car infotainment device, electronic equipment for ships, such as a marine navigation system or a gyrocompass, avionics, security equipment, or an industrial or home robot.

According to yet another embodiment, the electronic device may be furniture or part of a building, an electronic board, an electronic signature receiving device, a projector, or various measuring instruments, such as a water, electric, gas, or wave meters. The electronic device disclosed herein may be one of the above-mentioned devices or any combination thereof. As well understood by those skilled in the art, the present disclosure is not limited to the above-mentioned electronic devices.

According to embodiments, the electronic device may control the activation of a second sensor, based on a signal received through a first sensor, which reduces power consumption of the electronic device compared to a conventional device, in which the second sensor is always activated. The electronic device according to embodiments of the present disclosure may perform a predefined function in response to the signal received through the second sensor.

FIG. 1 is a block diagram 100 illustrating an electronic apparatus according to an embodiment of the present disclosure.

Referring to FIG. 1, the electronic device 101 may include a bus 110, a processor 120, a memory 130, a user input module (i.e., input/output interface) 150, a display 160, and a communication interface 170.

The bus 110 may be a circuit for interconnecting elements of the electronic device 101 and for allowing communication, such as by transferring control messages between the elements.

The processor 120 can receive commands from the memory 130, the user input module 150, the display 160, and the communication interface 170, through the bus 110, can process the received commands, and perform operations and/or data processing according to the commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

The memory 130 can store commands received from the processor 120 and/or other elements, and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of at least two thereof.

The kernel 141 can control and/or manage system resources used for execution of operations and/or functions implemented in other programming modules, such as the middleware 143, the API 145, and/or the applications 147, and can provide an interface through which the middleware 143, the API 145, and/or the applications 147 can access and then control and/or manage an individual element of the electronic device 101.

The middleware 143 can perform a relay function which allows the API 145 and/or the applications 147 to communicate with and exchange data with the kernel 141. In relation to operation requests received from at least one of applications 147, the middleware 143 can perform load balancing in relation to the operation requests from the application 147 by giving a priority in using the system resources such as the bus 110, the processor 120, and/or the memory 130.

The API 145 is an interface through which the applications 147 can control a function provided by the kernel 141 and/or the middleware 143, and may include at least one interface or function for file control, window control, image processing, etc.

The user input module 150 can receive a command and/or data from a user, and transfer the received command and/or data to the processor 120 and/or the memory 130 through the bus 110. The display 160 can display images, videos, and/or data to a user.

The communication interface 170 can establish a communication between the electronic device 101 and another electronic devices 102 and 104 and/or a server 106, and can support short range communication protocols, such as the wireless fidelity (WiFi) protocol, the Bluetooth (BT) protocol, the near field communication (NFC) protocol, etc. The communication interface 170 may also support long range protocols for communication networks, such as the Internet, local area network (LAN), wide area network (WAN), various telecommunication networks, various cellular networks, various satellite networks, plain old telephone service (POTS), or any other similar and/or suitable communication networks. Each of the electronic devices 102 and 104 may be the same type of device as the electronic device 101 or may be different types of electronic devices.

Figure 2:
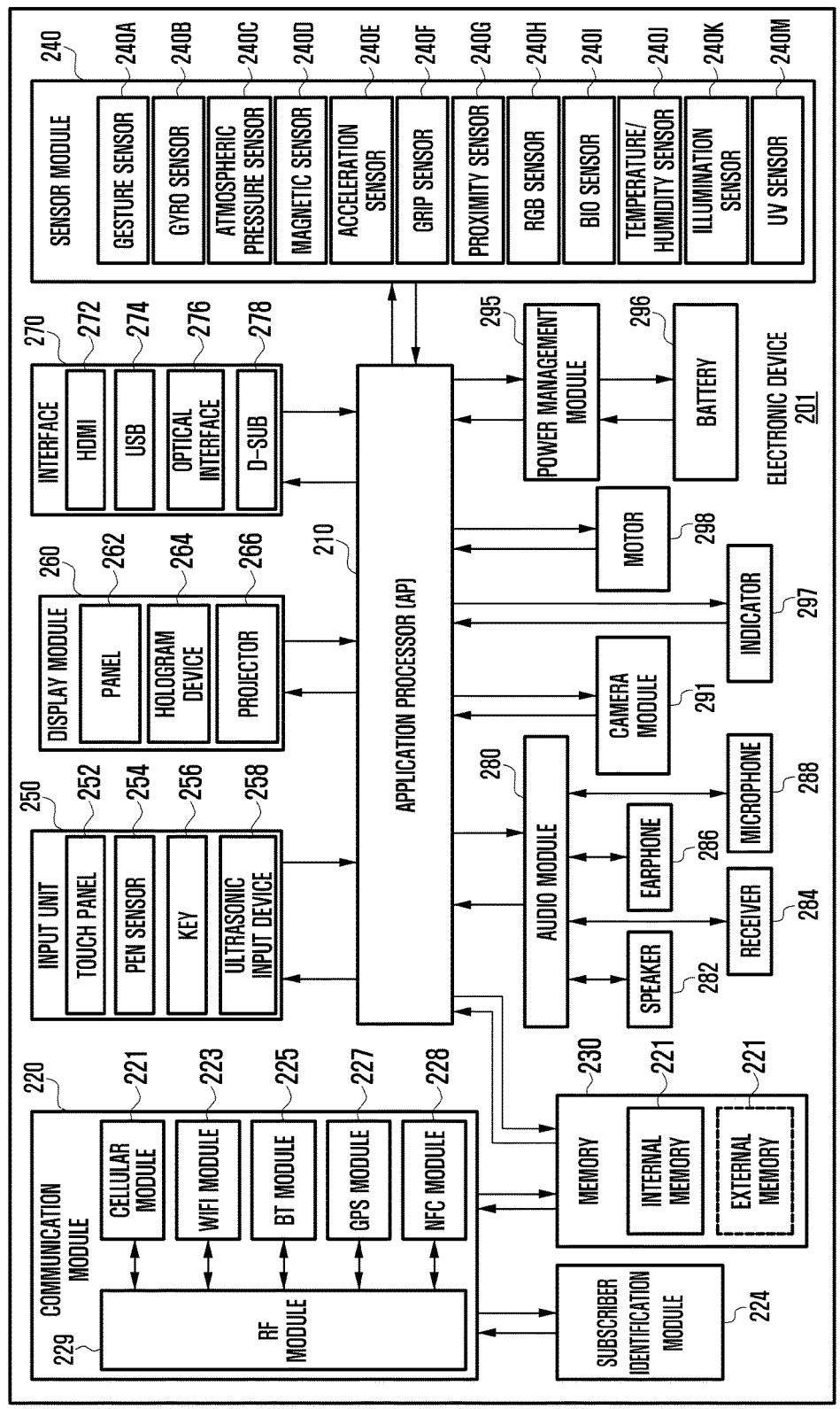
FIG. 2 is a block diagram illustrating an electronic device according to one embodiment of the present disclosure.

FIG. 2 illustrates an electronic device 201 in accordance with an embodiment of the present disclosure. The electronic device 201 may form all or part of the electronic device 101 shown in FIG. 1.

Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may execute the operating system or various applications, control a plurality of hardware or software components connected thereto, and also perform processing and operation for various data including multimedia data. The AP 210 may be a system-on-chip (SoC), and may further include a graphic processing unit (GPU).

The communication module 220 may perform data communication with any other electronic device connected to the electronic device 201 via a network. According to an embodiment, the communication module 220 may include therein a cellular module 221, a WiFi module 223, a BT module 225, a GPS module 227, an NFC module 228, and an RF (radio frequency) module 229.

The cellular module 221 may offer voice call, video call, text messaging, and/or Internet services through a communication network, such as long term evolution (LTE), LTE-advanced (LTE-A), code division multiple access (CDMA), wideband CDMA (WCDMA), universal mobile telecommunications system (UMTS), WiBro, or global system for mobile communication (GSM). Additionally, the cellular module 221 may perform identification and authentication of the electronic device in the communication network, using the SIM card 224. According to an embodiment, the cellular module 221 may perform at least part of functions the AP 210 can provide, such as multimedia.

According to an embodiment, the cellular module 221 may include a communication processor (CP), which may be another SoC, for example. Although some elements such as the cellular module 221, such as the CP, the memory 230, or the power management module 295 are shown as separate elements from the AP 210 in FIG. 2, some or all of these components may be integrated with the AP 210 in an embodiment of the present disclosure.

According to an embodiment, the AP 210 or the cellular module 221 may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 illustrates the cellular module 221, the WiFi module 223, the BT module 225, the GPS module 227 and the NFC module 228 as different components, at least two of these modules may be integrated in a single IC (integrated circuit) chip or a single IC package, such as integrated in a single SoC.

The RF module 229 may transmit and receive RF signals or any other electrical signals, and may include a transceiver, a PAM (power amp module), a frequency filter, or an LNA (low noise amplifier). The RF module 229 may further include additional components, e.g., wires or conductors, for the transmission of electromagnetic waves. Although FIG. 2 illustrates that the cellular module 221, the WiFi module 223, the BT module 225, the GPS module 227 and the NFC module 228 share the RF module 229, at least one of these modules may have its own separate RF module in an embodiment of the present disclosure.

The SIM card 224 may be inserted into a slot formed at a certain location of the electronic device. The SIM card 224 may contain therein an ICCID (integrated circuit card identifier) or an IMSI (international mobile subscriber identity).

The memory 230 may include an internal memory 232 and an external memory 234. The internal memory 232 may include a volatile memory, such as DRAM (dynamic random access memory), SRAM (static RAM), SDRAM (synchronous DRAM), and/or a nonvolatile memory, such as OTPROM (one time programmable read-only memory), PROM (programmable ROM), EPROM (erasable and programmable ROM), EEPROM (electrically erasable and programmable ROM), mask ROM, flash ROM, NAND flash memory, and NOR flash memory.

According to an embodiment, the internal memory 232 may be an SSD (solid state drive). The external memory 234 may be a flash drive, e.g., CF (compact flash), SD (secure digital), Micro-SD (micro secure digital), Mini-SD (mini secure digital), xD (extreme digital), or memory stick, and may be functionally connected to the electronic device 201 through various interfaces. The electronic device 201 may further include a storage device or medium such as a hard drive.

The sensor module 240 may measure various physical quantities or sense various operating statuses of the electronic device 201. The sensor module 240 may then convert the measured or sensed information into electrical signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H, such as an RGB (red, green, blue) sensor, a biometric sensor 2401, a temperature-humidity sensor 240J, an illumination sensor 240K, and a UV (ultraviolet) sensor 240M. Additionally or alternatively, the sensor module 240 may include an E-nose sensor, an EMG (electromyography) sensor, an EEG (electroencephalogram) sensor, an ECG (electrocardiogram) sensor, an IR (infrared) sensor, an iris scan sensor, or a finger scan sensor. The sensor module 240 may include a control circuit for controlling the one or more sensors equipped therein.

The input unit 250 may include a touch panel 252, a digital pen sensor 254, a key 256, or an ultrasonic input device 258. The touch panel 252 may recognize a touch input using capacitive, resistive, infrared, or ultrasonic sensing. The touch panel 252 may further include a control circuit. In case of capacitive sensing, both actual physical contact or proximity may be recognized. The touch panel 252 may further include a tactile layer that offers tactile feedback to a user.

The digital pen sensor 254 may work with a separate recognition sheet in the input unit 250 to generate touch inputs. The key 256 may include physical buttons, optical keys, or a keypad. The ultrasonic input device 258 is capable of identifying data by sensing sound waves with a microphone (MIC) 288 in the electronic device 201, where the sound waves are generated by an ultrasonic emitter. According to an embodiment, the electronic device 201 may receive a user input from an external device connected thereto through the communication module 220.

The display 260 may include a panel 262, a hologram device 264, or a projector 266. The panel 262 may be LCD (liquid crystal display), or AM-OLED (active matrix organic light emitting diode). The panel 262 may also be flexible, transparent, and integrated with the touch panel 252. The hologram device 264 may project a stereoscopic image in air using light interference. The projector 266 may project an image onto a screen, which may be located at the inside or outside of the electronic device 201. According to an embodiment, the display 260 may further include a control circuit for controlling the panel 262, the hologram device 264, and the projector 266.

The interface 270 may include HDMI (high-definition multimedia interface) 272, USB (universal serial bus) 274, optical 276, and D-sub (d-subminiature) 278 interfaces, and may be contained in the communication interface 170 shown in FIG. 1. Additionally or alternatively, the interface 270 may include an MHL (mobile high-definition link) interface, an SD (secure digital) card/MMC (multi-media card) interface, or an IrDA (infrared data association) interface.

The audio module 280 may perform conversion between sounds and electric signals. At least part of the audio module 280 may be contained in the input/output interface 150 shown in FIG. 1. The audio module 280 may process sound information inputted or outputted through a speaker 282, a receiver 284, an earphone 286, or the MIC 288.

The camera module 291 is capable of obtaining still images and moving images, and may include at least one image sensor, such as a front sensor or a rear sensor, a lens, an ISP (image signal processor, and a flash, such as LED or xenon lamp.

The power management module 295 may manage electric power of the electronic device 201 and may include a PMIC (power management integrated circuit), a charger IC, or a battery gauge.

The PMIC may be an IC chip or SoC. The charger IC may charge a battery 296 and prevent overvoltage or overcurrent from the charger. Charging may be performed in a wired or wireless manner, such as via magnetic resonance, magnetic induction, or other electromagnetic phenomenon. Wireless charging may require additional circuits such as coil loops, resonance circuits, rectifiers, etc.

The battery gauge may measure the residual amount of the battery 296 and the voltage, current or temperature of the battery during charging. The battery 296 may store electric power therein and supply electric power to the electronic device 201. The battery 296 may be a rechargeable or solar battery.

The indicator 297 may illustrate current statuses of the electronic device, such as when the device is booting, has received a message, or is recharging. The motor 298 may convert an electric signal into a mechanical vibration. The electronic device 201 may include a specific processor, such as GPU, for supporting particular applications such as mobile TV. This processor may process media data that comply with standards such as DMB (digital multimedia broadcasting), DVB (digital video broadcasting), or media flow.

Each of the above-discussed elements of the electronic device disclosed herein may be implemented using one or more components, and may have various names depending on the type of the electronic device. The electronic device disclosed herein may include at least one of the above-discussed elements and may include additional elements. Some of the elements may be integrated into a single component, where the single component performs all of the same functions of the elements before being integrated.

Figure 3:
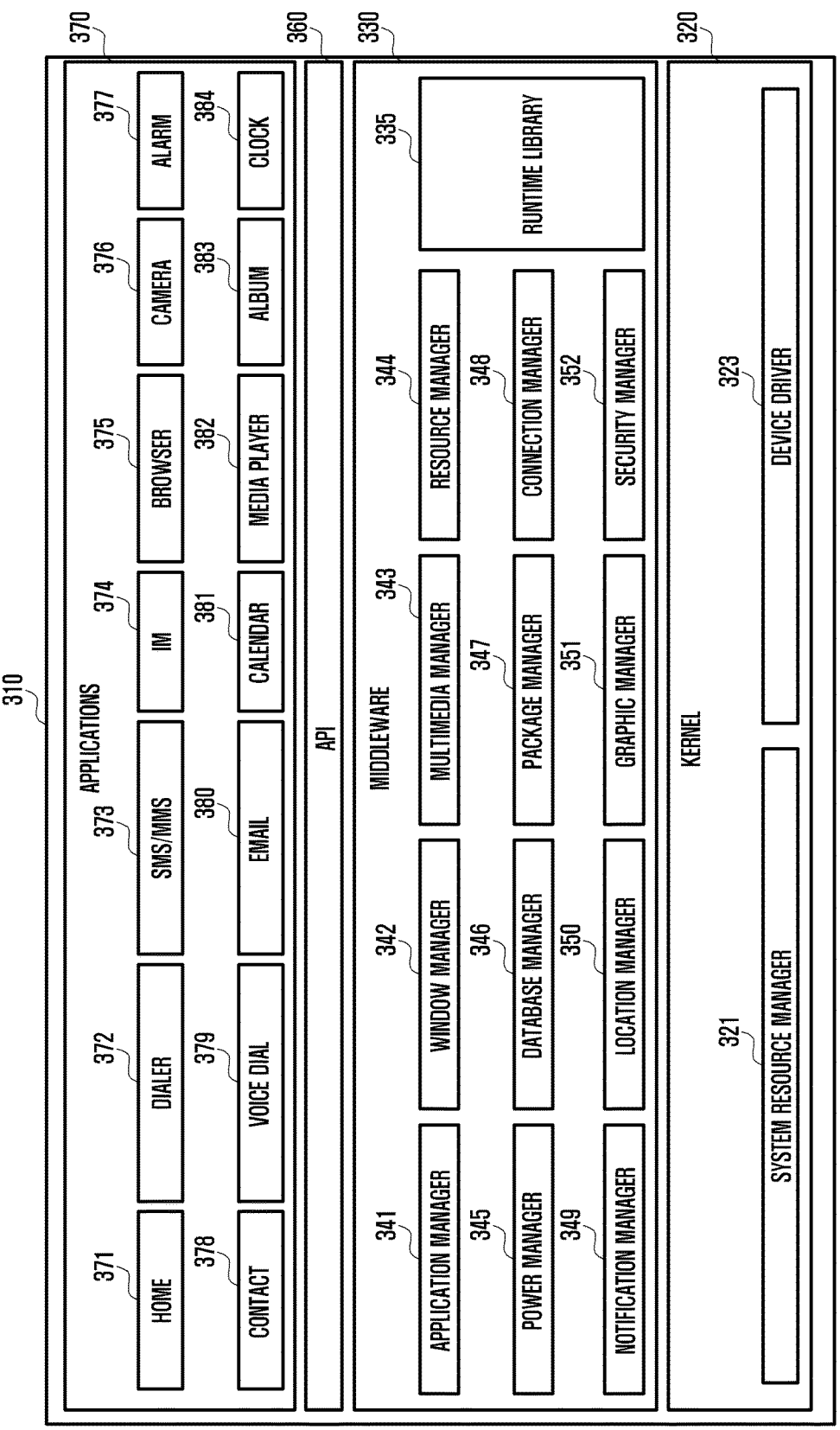
FIG. 3 is a block diagram illustrating a program module according to one embodiment of the present disclosure.

FIG. 3 is a block diagram illustrating a program module 310 according to an embodiment of the present disclosure.

The programming module 310 may be stored in the electronic device 101 or may be stored in the electronic device 201 illustrated in FIG. 2. At least a part of the programming module 310 may be implemented in software, firmware, hardware, or a combination of two or more thereof. The programming module 310 may include an OS controlling resources related to the electronic device and/or various applications 370 executed in the OS. For example, the OS may be Android, iOS, Windows, Symbian, Tizen, or Bada.

Referring to FIG. 3, the programming module 310 may include a kernel 320, middleware 330, an API 360, and/or applications 370.

The kernel 320 may include a system resource manager 321 and/or a device driver 323. The system resource manager 321 may include a process manager, a memory manager, and a file system manager. The system resource manager 321 may perform the control, allocation, or recovery of system resources. The device driver 323 may include a display driver, a camera driver, a Bluetooth driver, a shared memory driver, a USB driver, a keypad driver, a Wi-Fi driver, and/or an audio driver, and may further include an inter-process communication (IPC) driver.

The middleware 330 may include multiple modules so as to provide functions used in common by the applications 370, and may provide these functions to the applications 370 through the API 360 in order to enable the applications 370 to efficiently use limited system resources of the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include library modules used by compliers, in order to add functions during the execution of the applications 370, and may perform functions which are related to input and output, the management of the memory, or arithmetic functions.

The application manager 341 may manage the life cycle of at least one of the applications 370. The window manager 342 may manage GUI resources used on the screen. The multimedia manager 343 may detect formats used to reproduce various media files and may encode or decode the media files through appropriate codecs. The resource manager 344 may manage resources, such as source code, memory, or storage space, of at least one of the applications 370.

The power manager 345 may operate together with a basic input/output system (BIOS), may manage the battery or power, and may provide related power information. The database manager 346 may manage databases in such a manner as to enable the generation, search and/or change of the databases to be used by at least one of the applications 370. The package manager 347 may manage the installation and/or update of applications that are distributed in the form of package files.

The connectivity manager 348 may manage wireless connectivity such as Wi-Fi and Bluetooth. The notification manager 349 may display or report, to the user, events such as the reception of messages, appointments, proximity alarms, etc. The notifications may be done in such a manner so that the user is not greatly disturbed. The location manager 350 may manage location information of the electronic device. The graphics manager 351 may manage graphic effects, which are to be provided to the user, and/or user interfaces related to the graphic effects. The security manager 352 may provide various security functions used for system security and user authentication. According to an embodiment of the present disclosure, when the electronic device includes a telephone function, the middleware 330 may further include a telephony manager for managing a voice and/or video telephony.

The middleware 330 may generate and use new middleware module through various functional combinations of the above-described internal element modules, may provide modules specialized for different OSes, may dynamically delete some of the existing elements, or may add new elements. Accordingly, the middleware 330 may omit some of the elements described in the embodiments of the present disclosure, and/or may further include other elements not described.

The API 360 is a set of API programming functions, and may be provided in different configurations depending on the OS. In the case of Android or iOS, for example, one API set may be provided to each platform. In the case of Tizen, two or more API sets may be provided.

The applications 370 may include preloaded applications and/or third party applications, and may include home 371, dialer 372, a short message service (SMS)/multimedia messaging service (MMS) 373, instant message (IM) 374, browser 375, camera 376, alarm 377, contact 378, voice dial 379, electronic mail (e-mail) 380, calendar 381, media player 382, album 383, and clock application 384. Other applications are also possible.

At least a part of the programming module 310 may be implemented as instructions stored in a non-transitory computer-readable storage medium. When the instructions are executed by one or more processors, the one or more processors may perform functions corresponding to the instructions. The non-transitory computer-readable storage medium may be the memory 230. At least a part of the programming module 310 may be executed by the one or more processors 210, and may include a module, a program, a routine, a set of instructions, and/or a process for performing one or more functions.

Figure 4:
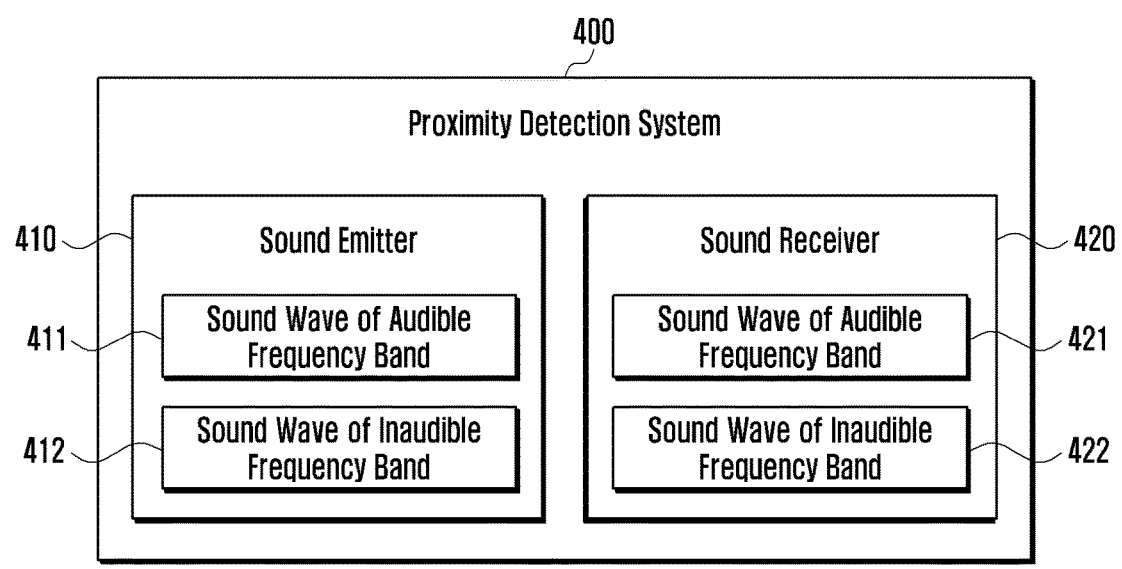
FIG. 4 is a block diagram schematically illustrating a proximity detection system according to one embodiment of the present disclosure.

FIG. 4 is a block diagram schematically illustrating a proximity detection system according to one embodiment of the present disclosure.

In one embodiment, an electronic device (e.g., 101 in FIG. 1 or 201 in FIG. 2) may use the proximity detection system 400 as shown in FIG. 4 to determine whether an object (e.g., a user's face) is proximate to the electronic device. In particular, without using an additional proximity sensor, the proximity detection system 400 may detect the proximity of the object by using a sound emitter (e.g., a speaker) and a sound receiver (e.g., a microphone) which are used in other operations of the electronic device, for example in phone calls.

The proximity detection system 400 may include a sound emitter 410 and a sound receiver 420. Although not shown in FIG. 4, the proximity detection system 400 is electrically connected to a controller (e.g., the processor 120 in FIG. 1 or the processor 210 in FIG. 2) of the electronic device and, under the control of the controller, may determine whether the object is proximate to the electronic device.

The sound emitter 410 of the proximity detection system 400 may emit sound waves in the audible frequency band 411 (e.g., voice) and sound waves in the inaudible frequency band 412 (e.g., ultrasonic waves). For example, the sound emitter 410 may alternatingly emit sound waves in the audible frequency band 411 and sound waves in the inaudible frequency band 412 at regular intervals. Alternatively, the sound emitter 410 may emit the sound waves in the audible frequency band 411 and the sound waves in the inaudible frequency band 412 together. However, in the latter case, the sound waves in the inaudible frequency band 412 may interfere with the sound waves in the audible frequency band 411 and generate noise. When this happens, call quality for example may deteriorate. This will be described below in detail with reference to FIG. 6.

The sound receiver 420 of the proximity detection system 400 may receive sound waves in the audible frequency band 421 (e.g., voice) and sound waves in the inaudible frequency band 422 (e.g., ultrasonic waves). Typically, the sound receiver 420 may receive the sound waves in the audible frequency band 421 and the sound waves in the inaudible frequency band 422 together and then analyze the received sound waves.

The sound receiver 420 of the proximity detection system 400 may receive the sound waves in the inaudible frequency band 422 depending on the operation currently performed by the electronic device. For example, during a phone call, the sound receiver 420 may alternatingly receive the sound waves in the audible frequency band 421 and the sound waves in the inaudible frequency band 422 at regular intervals. In another example, when the speakerphone function is used during the call (i.e., when the electronic device is spaced apart from the object), the sound receiver 420 may not perform the function of receiving the sound waves in the inaudible frequency band 422.

According to one embodiment, the proximity detection system 400 may emit sound waves through the sound emitter 410 and then receive the sound waves, reflected by the object, through the sound receiver 420. Accordingly, the proximity detection system 400 may determine whether the object is proximate to the electronic device, based on a time difference between emission and reception of the sound waves. Considering the characteristics of sound waves (e.g., the linearity of waves, the effect of ambient noises, etc.), for proximity detection, it is more accurate to use the sound waves in the inaudible frequency band than to use the sound waves in the audible frequency band. Specifically, audible sound waves are greatly affected by ambient noise and also lacks the linearity, and thus they are not suitable for proximity detection. However, in some cases, sound waves in the audible frequency band may be used for proximity detection. Scenarios of using sound waves in the audible frequency band or sound waves in the inaudible frequency band will be described below in detail with reference to drawings.

When emitting sound waves through the sound emitter 410, the proximity detection system 400 may apply a gain for adjusting the magnitude (e.g., volume) of the sound waves. For example, if the volume is too high during a call, the user of the electronic device may adjust the volume of the electronic device by pressing a key, a button, or a switch. In this case, the magnitude of the sound waves in the audible frequency band 411 is adjusted in response to user input, but the magnitude of the sound waves in the inaudible frequency band 412 may be unchanged. As the magnitude of emitted sound wave in the inaudible frequency band 412 is greater, proximity detection may be easier. Therefore, the sound waves in the inaudible frequency band 412, which are not heard and do not affect the user, may be emitted at a constant volume.

Figure 5A:
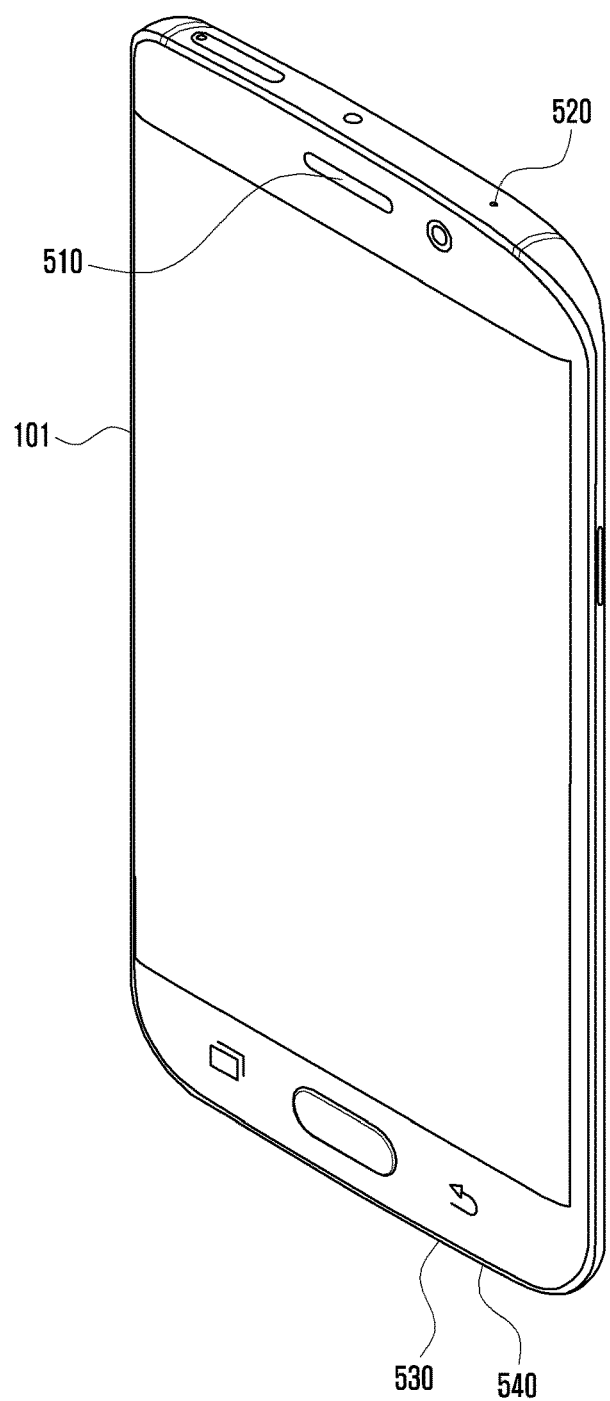
FIG. 5A and FIG. 5B are perspective views showing the arrangement of at least one sound emitter and at least one sound receiver mounted in an electronic device according to one embodiment of the present disclosure.
Figure 5B:
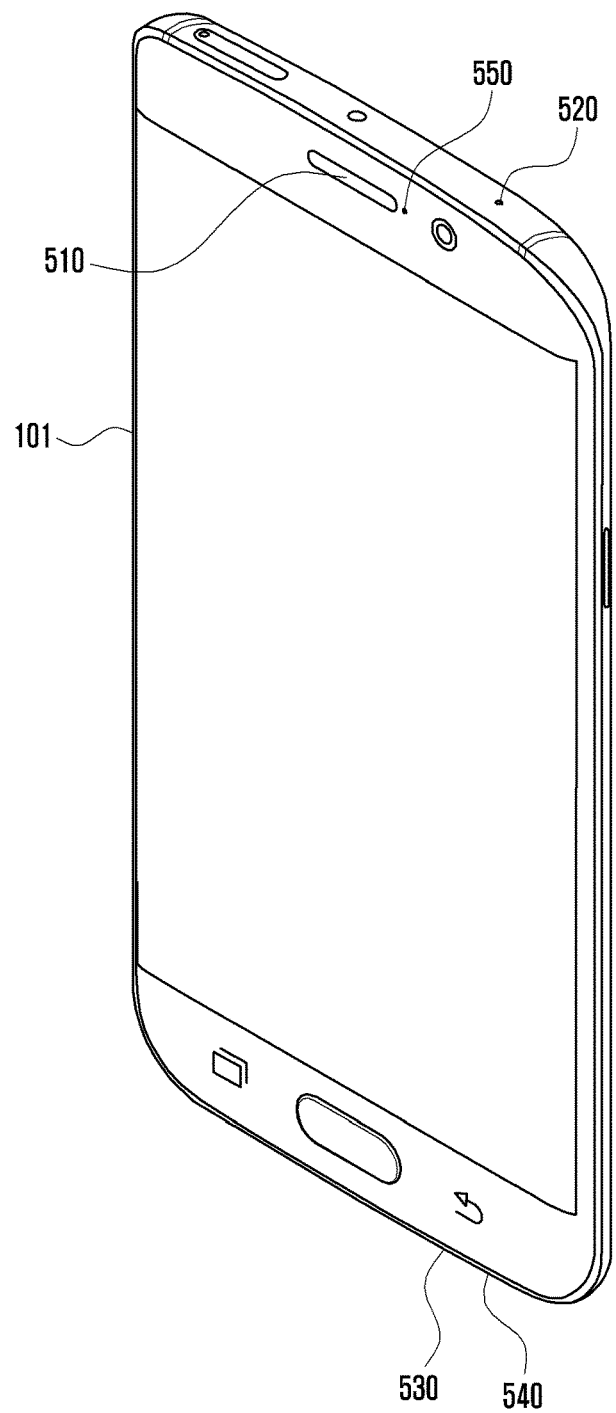

FIGS. 5A and 5B are perspective views showing the arrangement of at least one sound emitter and at least one sound receiver mounted in an electronic device according to one embodiment of the present disclosure.

As shown in FIG. 5A, in one embodiment, the electronic device 101 may include one or more sound emitters 510 and 530 and one or more sound receivers 520 and 540.

In order to detect the proximity of an object (e.g., a user's face), the sound emitter 510 and the sound receiver 520, which are located at an upper portion of the electronic device 101, may be used. That is, during a phone call for example, the lower portion of the electronic device 101 may not be in contact with the object. Thus, it may be more advantageous to use the upper sound emitter 510 and the upper sound receiver 520.

The sound waves emitted through the sound emitter 510 of the electronic device 101 may be reflected by the object, and then received by the sound receiver 520 of the electronic device 101. This reflection may be used to detect the proximity of the object.

As shown in FIG. 5B, in another embodiment, the electronic device 101 may include one or more sound emitters 510 and 530 (which will be also referred to as an upper sound emitter 510 and a lower sound emitter 530) and one or more sound receivers 520, 540 and 550 (which will be also referred to as an upper sound receiver 520, a lower sound receiver 540, and a front sound receiver 550).

According to this embodiment, the front sound receiver 550 of the electronic device 101 may be disposed on one side of the upper sound emitter 510. Although FIG. 5B, as an example, shows the front sound receiver 550 disposed on the right side of the upper sound emitter 510, the front sound receiver 550 may be disposed at any position near the upper sound emitter 510.

Alternatively, the front sound receiver 550 of the electronic device 101 may be disposed at the same position where the upper sound emitter 510 is disposed. Although the example of FIG. 5B shows the front sound receiver 550 disposed at a position different from that of the upper sound emitter 510, the front sound receiver 550 may be disposed within a region where the upper sound emitter 510 is disposed.

The front sound receiver 550 of the electronic device 101 may replace the function of the upper sound receiver 520. In this case, when the front sound receiver 550 is mounted in the electronic device, the upper sound receiver 520 may be removed.

Figure 6:
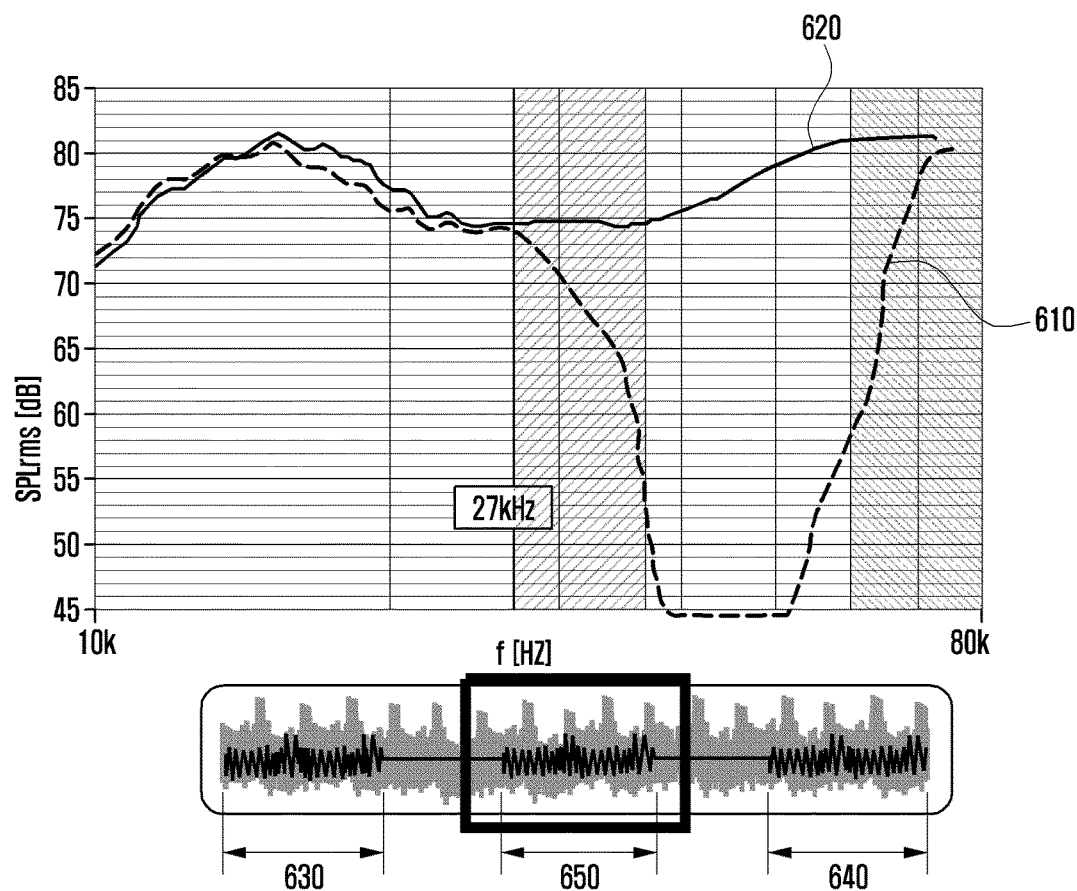
FIG. 6 is a diagram illustrating limitations caused by simultaneous emission of sound waves in the audible and inaudible frequency bands according to one embodiment of the present disclosure.

FIG. 6 is a diagram illustrating limitations caused by simultaneous emission of sound waves in the audible and inaudible frequency bands according to one embodiment of the present disclosure.

According to one embodiment, as disclosed above, the electronic device 101 may not have a separate component for emitting sound waves in the inaudible frequency band, and may emit sound waves in the inaudible frequency band through the above-discussed sound emitter (e.g., speaker).

As shown in FIG. 6, when sound waves in the audible frequency band 630 (e.g., voice) and sound waves in the inaudible frequency band 640 (e.g., ultrasonic waves) are emitted together through the sound emitter, for example during a phone call, unintentional noises 650 may occur.

According to one embodiment, the ideal waveform for when the sound emitter of the electronic device 101 emits the sound waves in the audible frequency band 630 together with the sound waves in the inaudible frequency band 640 is shown in FIG. 6 as waveform 610. However, due to technical restrictions, the sound emitter of the electronic device 101 may fail to separate the sound waves in the audible frequency band 630 and the sound waves in the inaudible frequency band 640 when simultaneously emitting such sound waves. Therefore, the actual waveform for when the sound emitter of the electronic device 101 emits the sound waves in the audible frequency band 630 together with the sound waves in the inaudible frequency band 640 is shown in FIG. 6 as waveform 620. As shown, noise 650 are generated in a certain frequency band where sound waves should not exist ideally. Thus, the noise interferes with the sound waves in the audible frequency band 630.

In order to reduce or eliminate the noise 650, the electronic device 101 may not simultaneously emit the sound waves in the audible frequency band and the sound waves in the inaudible frequency band.

However, even in case of simultaneously emitting the sound waves in the audible frequency band and the sound waves in the inaudible frequency band, to reduce the noise 650, the electronic device 101 may emit the sound waves in the inaudible frequency band within an interval that is imperceptible by a person (e.g., 2 ms). This way, noise 650 may be reduced or eliminated.

Figure 7:
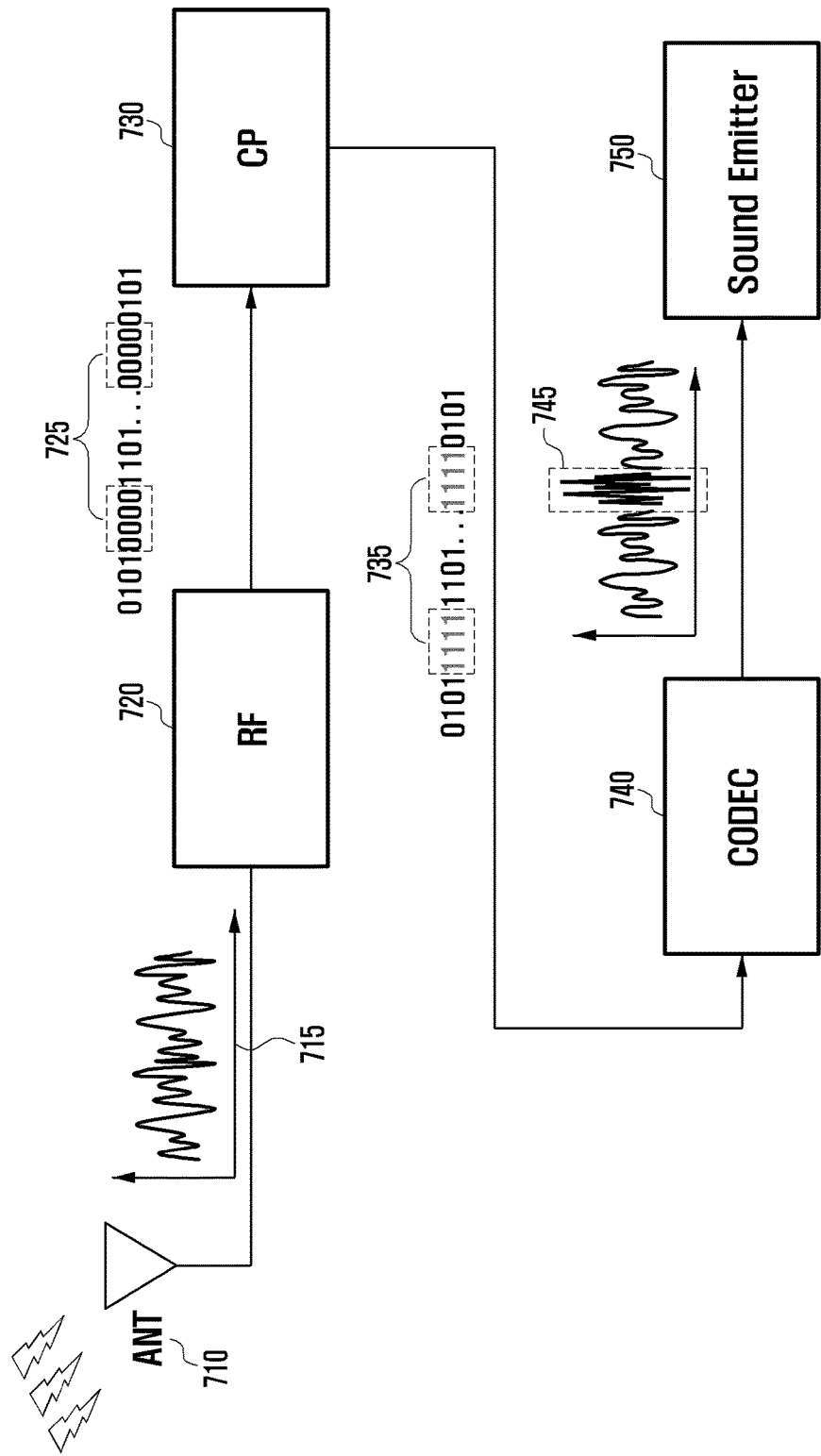
FIG. 7 is a block diagram schematically illustrating a method for processing sound waves in the audible and inaudible frequency bands for proximity detection by an electronic device according to one embodiment of the present disclosure.

FIG. 7 is a block diagram schematically illustrating a method for processing sound waves in audible and inaudible frequency bands for proximity detection by an electronic device according to one embodiment of the present disclosure.

As shown in FIG. 7, according to one embodiment, during a phone call, the electronic device 101 may process sound waves through an antenna 710, a radio frequency (RF) block 720, a communication processor (CP) 730, a codec 740, and a sound emitter 750.

The electronic device 101 may receive a voice signal 715 through the antenna 710 and the RF block 720 and deliver the received voice signal 715 to the CP 730.

The electronic device 101 may perform decoding and demodulation of the voice signal 715 through the CP 730. Through this, the electronic device 101 may convert the received voice signal 715 into a digital signal such as binary data.

The electronic device 101 may identify a certain section in which no voice signal exists (hereinafter referred to as an idle section) in the binary data. For example, the idle section may refer to a section in which there is data 725 of 0000000000000000.

When there is any idle section, the electronic device 101 may insert a specific data pattern for ultrasonic production in the idle section. For example, the electronic device 101 may insert the specific data pattern 735 (e.g., 1111111111111111) for ultrasonic production in the idle section determined as 0000000000000000.

In addition to inserting the specific data pattern 735, the electronic device 101 may deliver to the codec 740 a notification signal indicating that the specific data pattern for ultrasonic production is inserted.

The electronic device 101 may check whether the data received by the codec 740 from the CP 730 includes the specific data pattern for ultrasonic production. For example, by checking the specific data pattern 735 or the notification signal, the electronic device 101 may determine whether to control the sound emitter 750 to produce ultrasonic waves. If the received data includes data for ultrasonic production, the electronic device 101 may operate the sound emitter 750 to produce ultrasonic waves in the idle section 745 where there is little to no voice signal.

If the received data does not include the specific data pattern for ultrasonic production, this may mean that there is no idle section in the voice signal. Therefore, the electronic device 101 may emit the sound waves in the audible frequency band. In addition, the electronic device 101 may use an algorithm to determine whether the audio data in the voice signal 715 is actual voice signal or ambient noise.

When the audio data in the current voice signal is only ambient noise, the electronic device 101 may produce ultrasonic sounds wave in non-idle sections. Here, the electronic device may insert ultrasonic waves in a section where ambient noise is present, and the ultrasonic waves may be limited to an interval that is imperceptible by a person (e.g., 2 ms).

Thus, when a section of the voice signal consists of ambient noise, the electronic device 101 may emit an inaudible frequency signal (e.g., an ultrasonic wave) in a short interval in that section together with the audible frequency signal. In this case, even if the inaudible frequency signal interferes with the audible frequency signal as shown in FIG. 6, it may not matter to the user because (1) the inaudible frequency signal is transmitted in a section of the voice signal that consists only of ambient noise, and (2) the user may not detect the inaudible frequency signal because it is limited to a very short interval.

In another embodiment, even when the section of the current voice signal contains actual voice signal, the electronic device 101 may produce an inaudible frequency signal (e.g., an ultrasonic wave) in that section. For example, the electronic device 101 may insert ultrasonic waves in a section of the voice signal 715 that contains actual voice signals in intervals that are imperceptible by a person (e.g., 2 ms). However, even in this very short interval, some loss of actual voice cannot be avoided because actual voice data is partially removed and instead replaced by ultrasonic signals.

Figure 8:
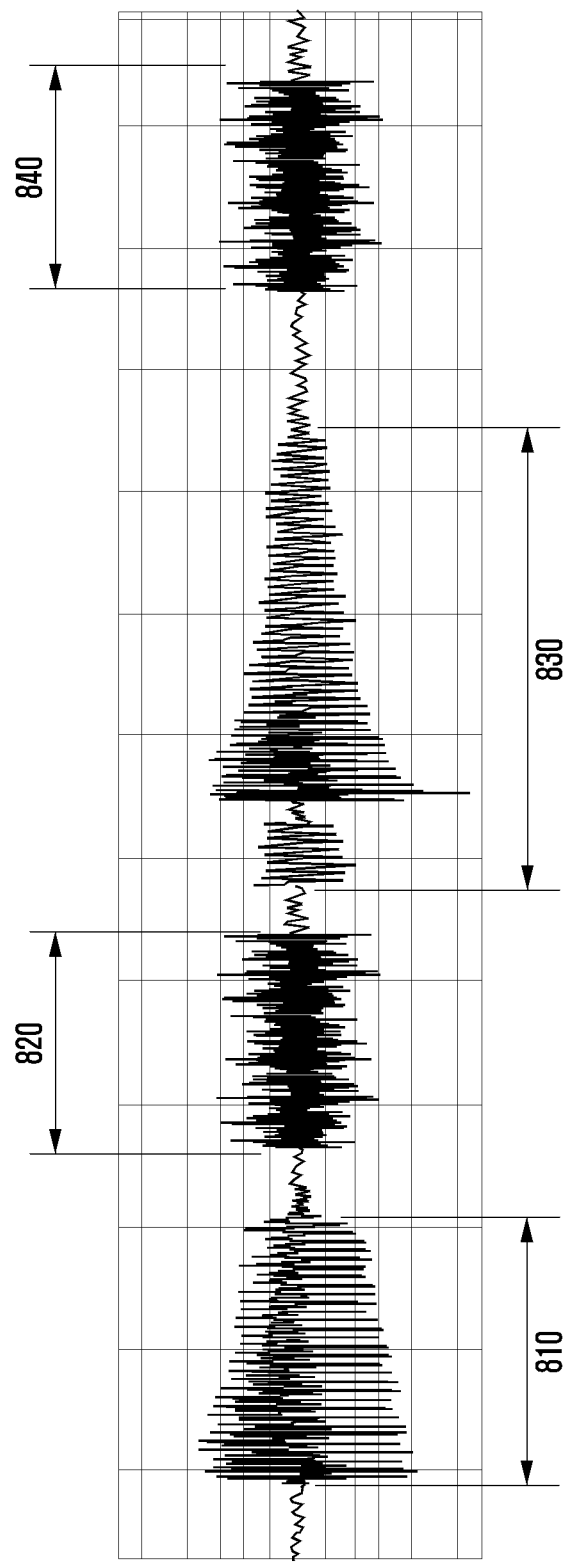
FIG. 8 is a diagram illustrating a method for alternatingly emitting sound waves of audible and inaudible frequency bands by taking advantage of when a voice signal is idle according to one embodiment of the present disclosure.

FIG. 8 is a diagram illustrating a method for alternatingly emitting sound waves of audible and inaudible frequency bands by taking advantage of when a voice signal is idle according to one embodiment of the present disclosure.

As shown in FIG. 8, according to one embodiment, the electronic device 101 may alternatingly emit sound waves in the audible frequency band and sound waves in the inaudible frequency band. For example, the electronic device 101 may analyze the voice signal received during a phone call and determine whether there are idle sections in the signal.

The electronic device 101 may identify the idle sections 820 and 840 as shown. The electronic device 101 may then emit sound waves in the audible frequency band in non-idle sections 810 and 830 (e.g. the voice signals), and also emit sound waves in the inaudible frequency band in the idle sections 820 and 840 (e.g. ultrasonic sound waves for proximity detection). Therefore, without causing noise, the electronic device 101 may detect the proximity of an object by emitting and receiving sound waves in the inaudible frequency band.

Figure 9:
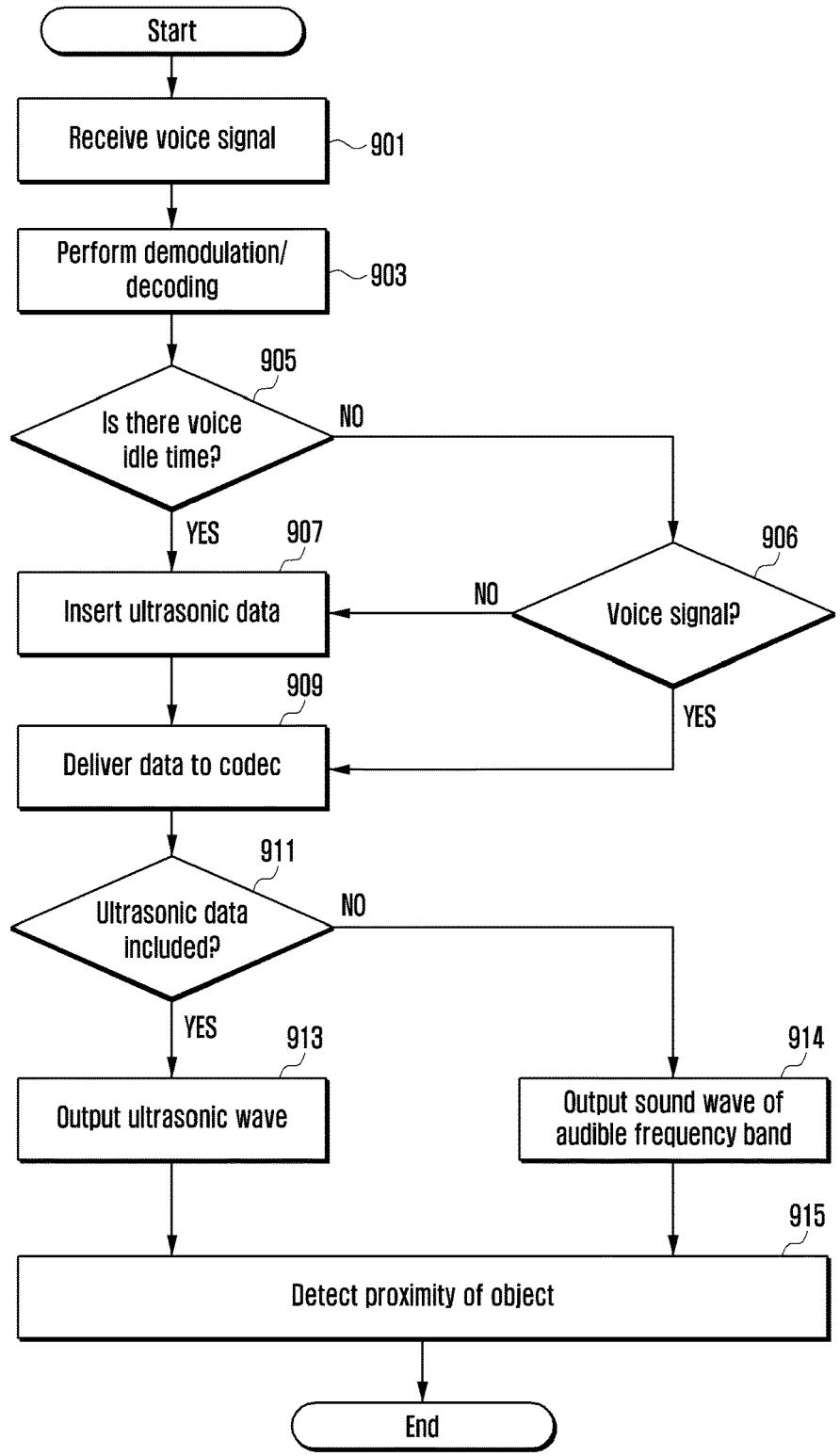
FIG. 9 is a flow chart illustrating a first method for processing sound waves in the audible and inaudible frequency bands for proximity detection by an electronic device according to one embodiment of the present disclosure.

FIG. 9 is a flow chart illustrating a first method for processing sound waves in the audible and inaudible frequency bands for proximity detection by an electronic device according to one embodiment of the present disclosure.

According to one embodiment, at operation 901, the electronic device 101 may receive a voice signal.

At operation 903, the electronic device 101 may perform decoding and demodulation of the received voice signal.

Through this, the electronic device 101 may convert the received voice signal into a digital signal such as binary data.

At operation 905, the electronic device 101 may determine whether there is a voice idle time in the binary data.

If it is determined at operation 905 that there is no idle time, the electronic device 101 may further determine at operation 906 whether a particular section of the received voice signal is the actual voice signal or ambient noise. For example, the electronic device 101 may use an algorithm for distinguishing voice signals from ambient noise and thereby determine whether the received voice signal is actual voice signal or ambient noise.

If is determined at operation 905 that there is an idle time, or if it is determined at operation 906 that the received voice signal is ambient noise, the electronic device 101 may insert a specific data pattern for ultrasonic production in the idle section or the ambient noise section at operation 907. For example, the electronic device 101 may insert a specific data pattern for ultrasonic production in a certain section determined as idle time. In addition to inserting the specific data pattern, the electronic device 101 may deliver, to the codec, a notification signal indicating that data for ultrasonic production is inserted.

If it is determined at operation 906 that the section of the received voice signal is actual voice signal, the electronic device 101 may deliver data to the codec at operation 909 without inserting the specific data pattern for ultrasonic production. For example, the electronic device 101 may transmit data processed by the CP to the codec.

At operation 911, the electronic device 101 may determine whether the data received by the codec from the CP includes data for ultrasonic production. For example, by identifying the specific data pattern or the notification signal, the electronic device 101 may determine whether to operate in an ultrasonic production mode.

If it is determined at operation 911 that data for ultrasonic production is included, the electronic device 101 may produce ultrasonic waves at operation 913.

If it is determined at operation 911 that no data for ultrasonic production is included, the electronic device 101 may output sound waves in the audible frequency band at operation 914.

At operation 915, the electronic device 101 may detect whether an object is proximate to the electronic device 101, by using the ultrasonic waves produced at operation 913 or the sound waves in the audible frequency band outputted at operation 914.

Figure 10:
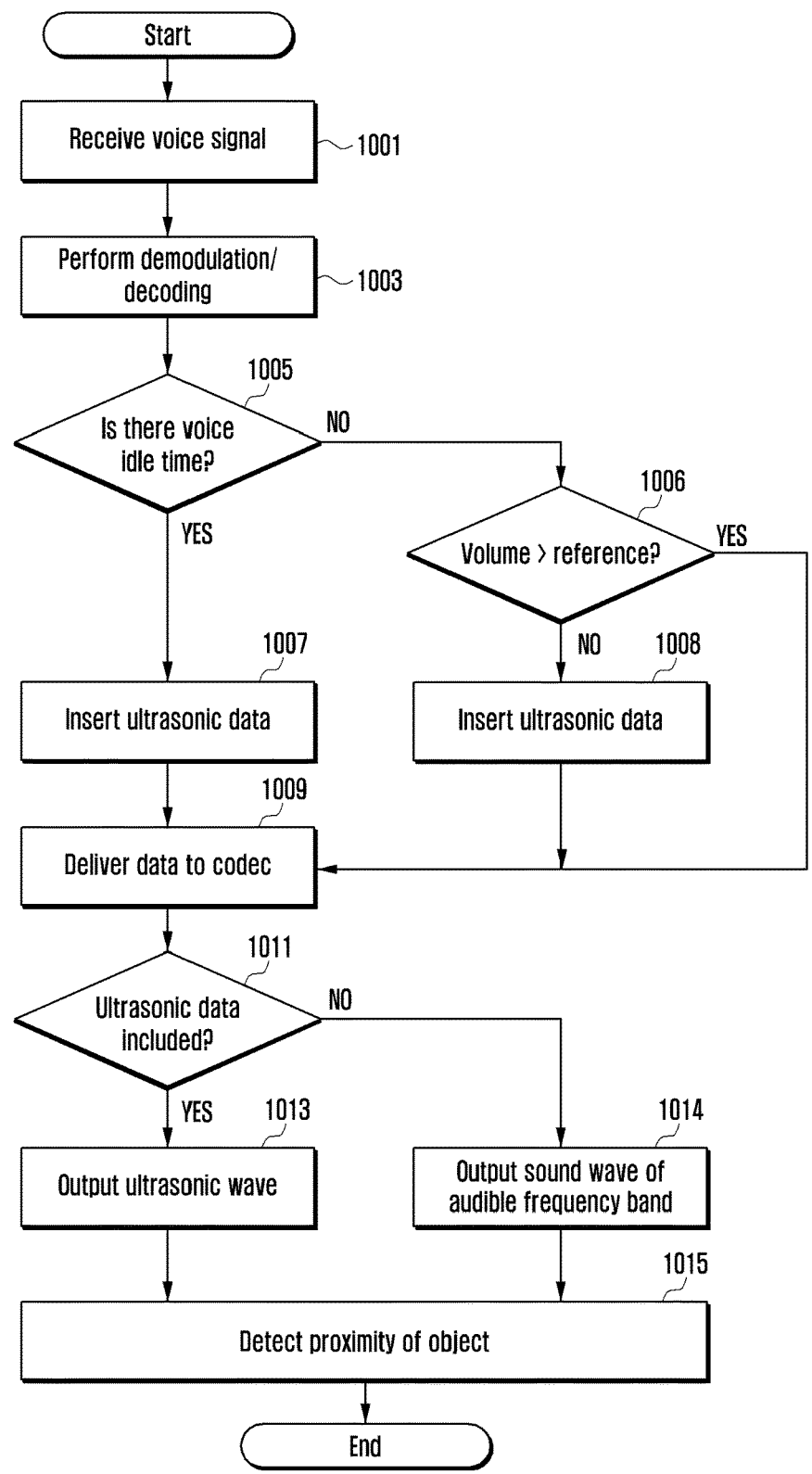
FIG. 10 is a flow chart illustrating a second method for processing sound waves in the audible and inaudible frequency bands for proximity detection by an electronic device according to one embodiment of the present disclosure.

FIG. 10 is a flow chart illustrating a second method for processing sound waves in the audible and inaudible frequency bands for proximity detection by an electronic device according to one embodiment of the present disclosure.

According to one embodiment, at operation 1001, the electronic device 101 may receive a voice signal.

At operation 1003, the electronic device 101 may perform decoding and demodulation of the received voice signal. Through this, the electronic device 101 may convert the received voice signal into a digital signal such as binary data.

At operation 1005, the electronic device 101 may determine whether there is a voice idle time in the binary data.

If is determined at operation 1005 that there is an idle time, the electronic device 101 may insert a specific data pattern for ultrasonic production in an idle section at operation 1007. For example, the electronic device 101 may insert a specific data pattern for ultrasonic production in a certain section determined as idle time. In addition to inserting the specific data pattern, the electronic device 101 may deliver, to the codec, a notification signal indicating that data for ultrasonic production is inserted.

If it is determined at operation 1005 that there is no idle time, the electronic device 101 may further determine at operation 1006 whether a current volume (e.g., a call volume) is higher than a reference value. For example, based on the call volume, the electronic device 101 may detect the proximity of the object by using sound waves in the audible or inaudible frequency band.

If is determined at operation 1006 that the current volume is lower than the reference value, the electronic device 101 may insert the specific data pattern for ultrasonic production at operation 1008. For example, when the call volume is lower than the reference value, the electronic device 101 may detect the proximity of the object using ultrasonic waves.

If it is determined at operation 1006 that the current volume is higher than the reference value, the electronic device 101 may deliver data to the codec at operation 1009 without insertion of the specific data pattern for ultrasonic production. Thus, when the call volume is higher than the reference value, the electronic device 101 may detect the proximity of the object using audible sound waves.

At operation 1009, the electronic device 101 may deliver data processed by the CP to the codec.

At operation 1011, the electronic device 101 may determine whether the data received by the codec from the CP includes data for ultrasonic production. For example, by identifying the specific data pattern or the notification signal, the electronic device 101 may determine whether to operate in an ultrasonic production mode.

If it is determined at operation 1011 that data for ultrasonic production is included, the electronic device 101 may produce ultrasonic waves at operation 1013.

If it is determined at operation 1011 that no data for ultrasonic production is included, the electronic device 101 may output sound waves in the audible frequency band at operation 1014.

At operation 1015, the electronic device 101 may detect whether an object is proximate to the electronic device 101, by using the ultrasonic waves produced at operation 1013 or the sound waves in the audible frequency band outputted at operation 1014.

According to one embodiment, the electronic device may include a communication module, a sound emitter, a sound receiver, and a processor electrically connected to the communication module, the sound emitter, and the sound receiver. The processor may be configured to receive at least one part of a voice signal from a calling party through the communication module, to determine whether there is a voice idle time in the at least one part of the voice signal, to output a sound wave in an inaudible frequency band through the sound emitter during the voice idle time, when the voice idle time is present in the at least one part of the voice signal, to receive, through the sound receiver, sound wave in the inaudible frequency band reflected from an object, and to detect whether the object is proximate to the electronic device using the reflected sound wave in the inaudible frequency band.

The processor may be further configured to determine whether the at least one part of the voice signal contains actual voice data of the calling party, when the voice idle time is not present in the at least one part of the voice signal, and to output the actual voice data of the calling party through the sound emitter, when the at least one part of the voice signal contains the actual voice data of the calling party.

The processor may be further configured to determine whether the at least one part of the voice signal contains actual voice data of the calling party, when the voice idle time is not present in the at least one part of the voice signal, to output the sound wave in the inaudible frequency band through the sound emitter in the at least one part of the voice signal, when the at least one part of the voice signal does not contain the actual voice data of the calling party.

The processor may be further configured to generate binary data by decoding and demodulating the at least one part of the voice signal, where the determination of whether there is the voice idle time in the at least one part of the voice signal is based on the binary data.

The processor may be further configured to insert a specific data pattern in the binary data, so that the sound emitter produces the sound wave in the inaudible frequency band based on the specific data pattern.

The processor may be further configured to deliver a notification indicating insertion of the specific data pattern.

The sound emitter may be a speaker mounted in the electronic device, and the sound receiver may be a microphone mounted in the electronic device.

The sound wave of inaudible frequency band may an ultrasonic wave.

The sound emitter and the sound receiver may be formed as an integrated module and disposed on a surface of the electronic device.

The sound emitter may be disposed on a first surface of the electronic device, and the sound receiver may be disposed on a second surface of the electronic device. The first and second surfaces are different surfaces.

The processor may be further configured to maintain a volume of the sound wave in the inaudible frequency band in response to a user's volume control input.

The processor may be further configured to determine whether a volume of the at least one part of the voice signal is greater than a predetermined value, when the voice idle time is not present in the at least one part of the voice signal, to output a sound wave in the audible frequency band through the sound emitter corresponding to the at least one part of the voice signal, when the volume of the at least one part of the voice signal is greater than the predetermined value, to receive, through the sound receiver, sound wave in the audible frequency band reflected from the object, and to detect whether the object is proximate to the electronic device using the reflected sound wave in the audible frequency band.

According to various embodiments, a method for detecting proximity of an object at the electronic device may include receiving at least one part of a voice signal from a calling party; determining whether there is a voice idle time in the at least one part of the voice signal; outputting a sound wave in an inaudible frequency band through a sound emitter during the voice idle time, when the voice idle time is present in the at least one part of the voice signal; receiving, through a sound receiver, sound wave in the inaudible frequency band reflected from the object; and detecting whether the object is proximate to the electronic device using the reflected sound wave in the inaudible frequency band.

The method may further include determining whether the at least one part of the voice signal contains actual voice data, when the voice idle time is not present in the at least one part of the voice signal; and outputting the actual voice data of the calling party through the sound emitter, when the at least one part of the voice signal contains the actual voice data of the calling party.

The method may further include determining whether the at least one part of the voice signal contains actual voice data of the calling party, when the voice idle time is not present in the at least one part of the voice signal; outputting the sound wave in the inaudible frequency band through the sound emitter in the at least one part of the voice signal, when the at least one part of the voice signal does not contain the actual voice data of the calling party.

The determination of whether there is the voice idle time in the at least one part of the voice signal may include generating binary data by decoding and demodulating the at least one part of the voice signal, where the determination of whether there is the voice idle time in the at least one part of the voice signal is based on the binary data.

The method may further include inserting a specific data pattern in the binary data, so that the sound emitter produces the sound wave in the inaudible frequency band based on the specific data pattern.

The method may further include delivering a notification indicating insertion of the specific data pattern.

The sound emitter may be a speaker mounted in the electronic device, and the sound receiver may be a microphone mounted in the electronic device.

The method may further include maintaining a volume of the sound wave in the inaudible frequency band in response to a user's volume control input.

The method may further include determining whether a volume of the at least one part of a voice signal is greater than a predetermined value, when the voice idle time is not present in the at least one part of the voice signal; outputting a sound wave in an audible frequency band through the sound emitter corresponding to the at least one part of the voice signal, when the volume of the at least one part of the voice signal is greater than the predetermined value; receiving, through the sound receiver, sound wave in the audible frequency band reflected from the object; and detecting whether the object is proximate to the electronic device using the reflected sound wave in the audible frequency band.

The term "module" used in the present disclosure may refer to a unit including one or more combinations of hardware, software, and firmware. The "module" may be interchangeable with a term, such as "unit," "logic," "logical block," "component," or "circuit." The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

The operations performed by modules, programming modules, or the other components, according to the present disclosure, may be executed in serial, parallel, repetitive or heuristic fashion. Part of the operations can be executed in any other order, omitted, or executed with additional operations.

Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. No claim element herein is to be construed under the provisions of 35 U.S.C. 112, sixth paragraph, unless the element is expressly recited using the phrase "means for."

What is claimed is:

1. An electronic device comprising:
    a communication module;
    a sound emitter;
    a sound receiver; and
    a processor electrically connected to the communication module, the sound emitter, and the sound receiver, wherein the processor is configured to:
        receive at least one part of a voice signal from a calling party through the communication module,
        determine whether there is a voice idle time in the at least one part of the voice signal,
        when the voice idle time is present in the at least one part of the voice signal, output a sound wave in an inaudible frequency band through the sound emitter during the voice idle time,
        receive, through the sound receiver, sound wave in the inaudible frequency band reflected from an object, and
        detect whether the object is proximate to the electronic device using the reflected sound wave in the inaudible frequency band.

2. The electronic device of claim 1, wherein the processor is further configured to:
    when the voice idle time is not present in the at least one part of the voice signal, determine whether the at least one part of the voice signal contains actual voice data of the calling party, and
    when the at least one part of the voice signal contains the actual voice data of the calling party, output the actual voice data of the calling party through the sound emitter.

3. The electronic device of claim 1, wherein the processor is further configured to:
    when the voice idle time is not present in the at least one part of the voice signal, determine whether the at least one part of the voice signal contains actual voice data of the calling party, and
    when the at least one part of the voice signal does not contain the actual voice data of the calling party, output the sound wave in the inaudible frequency band through the sound emitter in the at least one part of the voice signal.

4. The electronic device of claim 1, wherein the processor is further configured to:
    generate binary data by decoding and demodulating the at least one part of the voice signal, wherein the determination of whether there is the voice idle time in the at least one part of the voice signal is based on the binary data.

5. The electronic device of claim 4, wherein the processor is further configured to insert a specific data pattern in the binary data, so that the sound emitter produces the sound wave in the inaudible frequency band based on the specific data pattern.

6. The electronic device of claim 5, wherein the processor is further configured to deliver a notification indicating insertion of the specific data pattern.

7. The electronic device of claim 1, wherein the sound emitter is a speaker mounted in the electronic device, and
    wherein the sound receiver is a microphone mounted in the electronic device.

8. The electronic device of claim 1, wherein the sound emitter and the sound receiver are an integrated module and disposed on a surface of the electronic device.

9. The electronic device of claim 1, wherein the sound emitter is disposed on a first surface of the electronic device,
    wherein the sound receiver is disposed on a second surface of the electronic device, and
    wherein the first and second surfaces are different surfaces.

10. The electronic device of claim 1, wherein the processor is further configured to maintain a volume of the sound wave in the inaudible frequency band in response to a user's volume control input.

11. The electronic device of claim 1, wherein the processor is further configured to:
    when the voice idle time is not present in the at least one part of the voice signal, determine whether a volume of the at least one part of the voice signal is greater than a predetermined value,
    when the volume of the at least one part of the voice signal is greater than the predetermined value, output a sound wave in an audible frequency band through the sound emitter corresponding to the at least one part of the voice signal,
    receive, through the sound receiver, sound wave in the audible frequency band reflected from the object, and
    detect whether the object is proximate to the electronic device using the reflected sound wave in the audible frequency band.

12. A method for detecting proximity of an object at an electronic device, the method comprising:
    receiving at least one part of a voice signal from a calling party;

determining whether there is a voice idle time in the at least one part of the voice signal;

when the voice idle time is present in the at least one part of the voice signal, outputting a sound wave in an inaudible frequency band through a sound emitter during the voice idle time;

receiving, through a sound receiver, sound wave in the inaudible frequency band reflected from the object; and detecting whether the object is proximate to the electronic device using the reflected sound wave in the inaudible frequency band.

13. The method of claim 12, further comprising:

when the voice idle time is not present in the at least one part of the voice signal, determining whether the at least one part of the voice signal contains actual voice data of the calling party; and when the at least one part of the voice signal contains the actual voice data of the calling party, outputting the actual voice data of the calling party through the sound emitter.

14. The method of claim 12, further comprising:

when the voice idle time is not present in the at least one part of the voice signal, determining whether the at least one part of the voice signal contains actual voice data of the calling party; and when the at least one part of the voice signal does not contain the actual voice data of the calling party, outputting the sound wave in the inaudible frequency band through the sound emitter in the at least one part of the voice signal.

15. The method of claim 12, wherein the determination of whether there is the voice idle time in the at least one part of the voice signal includes:

generating binary data by decoding and demodulating the at least one part of the voice signal, wherein the determination of whether there is the voice idle time in the at least one part of the voice signal is based on the binary data.

16. The method of claim 15, further comprising:

inserting a specific data pattern in the binary data, so that the sound emitter produces the sound wave in the inaudible frequency band based on the specific data pattern.

17. The method of claim 16, further comprising:

delivering a notification indicating insertion of the specific data pattern.

18. The method of claim 12, wherein the sound emitter is a speaker mounted in the electronic device, and the sound receiver is a microphone mounted in the electronic device.

19. The method of claim 12, further comprising:

maintaining a volume of the sound wave in the inaudible frequency band in response to a user's volume control input.

20. The method of claim 12, further comprising:

when the voice idle time is not present in the at least one part of the voice signal, determining whether a volume of the at least one part of the voice signal is greater than a predetermined value;

when the volume of the at least one part of the voice signal is greater than the predetermined value, outputting a sound wave in an audible frequency band through the sound emitter corresponding to the at least one part of the voice signal;

receiving, through the sound receiver, sound wave in the audible frequency band reflected from the object; and detecting whether the object is proximate to the electronic device using the reflected sound wave in the audible frequency band.

* * * * *